US012325043B2

(12) United States Patent
Orita et al.

(10) Patent No.: US 12,325,043 B2
(45) Date of Patent: Jun. 10, 2025

(54) ULTRASONIC ATOMIZATION APPARATUS

(71) Applicant: Toshiba Mitsubishi-Electric Industrial Systems Corporation, Tokyo (JP)

(72) Inventors: Hiroyuki Orita, Tokyo (JP); Takahiro Hiramatsu, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 797 days.

(21) Appl. No.: 17/429,647

(22) PCT Filed: Jan. 17, 2020

(86) PCT No.: PCT/JP2020/001477
§ 371 (c)(1),
(2) Date: Aug. 10, 2021

(87) PCT Pub. No.: WO2021/144952
PCT Pub. Date: Jul. 22, 2021

(65) Prior Publication Data
US 2022/0203390 A1 Jun. 30, 2022

(51) Int. Cl.
*B05B 7/24* (2006.01)
*B05B 7/00* (2006.01)
*B05B 17/06* (2006.01)

(52) U.S. Cl.
CPC .......... *B05B 7/2491* (2013.01); *B05B 7/0012* (2013.01); *B05B 17/0615* (2013.01); *B05B 17/0653* (2013.01)

(58) Field of Classification Search
CPC . B05B 7/2491; B05B 7/0012; B05B 17/0615; B05B 17/0653
USPC ....................................................... 239/102.1
See application file for complete search history.

(56) References Cited

U.S. PATENT DOCUMENTS

2010/0187328 A1* 7/2010 Konishi ................ B05B 7/0081 239/102.1
2016/0158788 A1* 6/2016 Orita ....................... B05B 17/06 239/102.1

FOREIGN PATENT DOCUMENTS

JP 55-68576 U 5/1980
JP 59-209675 A 11/1984
JP 60-82164 A 5/1985
JP 6-15757 U 3/1994
JP 2006142119 A * 6/2006
JP 2008-100204 A 5/2008
JP 2009-28574 A 2/2009
(Continued)

OTHER PUBLICATIONS

International Search Report and Written Opinion mailed on Mar. 31, 2020, received for PCT Application PCT/JP2020/001477, Filed on Jan. 17, 2020, 11 pages including English Translation.
(Continued)

*Primary Examiner* — Qingzhang Zhou
*Assistant Examiner* — Kevin Edward Schwartz
(74) *Attorney, Agent, or Firm* — XSENSUS LLP

(57) ABSTRACT

In an ultrasonic atomization apparatus of the present invention, a separator cup and four ultrasonic vibrators are provided to satisfy a reflected wave avoidance condition that "four reflected waves are not received by any of the four ultrasonic vibrators". Specifically, a set curvature of a bottom surface of the separator cup is set to be larger than a conventional set curvature. In addition, a distance from a center point of a bottom surface of the water tank of each of the four ultrasonic vibrators is set to be longer than a conventional distance.

2 Claims, 9 Drawing Sheets

(56) References Cited

FOREIGN PATENT DOCUMENTS

| | | | |
|---|---|---|---|
| JP | 2016-190172 | A | 11/2016 |
| WO | 2015/019468 | A1 | 2/2015 |

OTHER PUBLICATIONS

Extended European Search Report issued Sep. 15, 2022 in corresponding European Patent Application No. 20913082.2, 9 pages.

Taiwanese Office Action issued on Sep. 10, 2021 in Taiwan Application No. 109143674.

* cited by examiner

ULTRASONIC ATOMIZATION APPARATUS

CROSS-REFERENCE TO RELATED APPLICATIONS

The present application is based on PCT filing PCT/JP2020/001477, filed Jan. 17, 2020, the entire contents of which are incorporated herein by reference. This application is related to U.S. patent application Ser. No. 17/429,642, entitled ULTRASONIC ATOMIZATION APPARATUS, filed on the same day as this application and is hereby incorporated by reference

TECHNICAL FIELD

The present invention relates to an ultrasonic atomization apparatus that atomizes a source solution into fine mist by using an ultrasonic vibrator and transfers the mist to the outside.

BACKGROUND ART

In a field of manufacturing electronic devices, an ultrasonic atomization apparatus is used in some cases. In the field of the electronic device manufacturing, the ultrasonic atomization apparatus atomizes a solution by using ultrasonic waves that are oscillated from an ultrasonic vibrator, and sends out the atomized solution to the outside by using transfer gas. When the source solution mist transferred to the outside is sprayed onto a substrate, a thin film for the electronic device is formed on the substrate.

Various solvents are used for the source solution used in the film formation, and in order to prevent erosion of the ultrasonic vibrator, a double chamber method, in which the source solution and the ultrasonic vibrator do not come into contact with each other, is used. In the double chamber method, in order to separate the ultrasonic vibrator and the source solution, a separator cup for accommodating the source solution is used separately for a water tank provided with the ultrasonic vibrator in its bottom surface. The separator cup is required to allow transmission of ultrasonic waves; however, a part of the ultrasonic waves is reflected. Note that an ultrasonic wave conveyance solvent is accommodated in the water tank.

One example of the ultrasonic atomization apparatus employing the double chamber method described above is an atomization apparatus disclosed in Patent Document 1.

PRIOR ART DOCUMENTS

Patent Documents

Patent Document 1: WO 2015/019468 A

SUMMARY

Problem to be Solved by the Invention

When ultrasonic waves from the ultrasonic vibrator provided in the bottom surface of the water tank enter (impinge on) the bottom surface of the separator cup through the ultrasonic wave conveyance solvent being an inert liquid, transmission waves and reflected waves are generated. The transmission waves transmit through the bottom surface of the separator cup to enter the source solution, and the reflected waves travel toward the bottom surface of the water tank.

In order to entirely obtain the transmission waves without generating the reflected waves, constituent materials having the same acoustic impedance need to be used as the constituent materials of the ultrasonic wave conveyance solvent and the separator (the bottom surface thereof). However, it is practically extremely difficult to have the acoustic impedances of both of the constituent materials completely match each other, and reflected waves are inevitably generated.

The reflected waves are radiated toward the bottom surface side of the water tank. Thus, along with reception of the reflected waves, the water tank (the bottom surface thereof) may be melted or the ultrasonic vibrator provided in the bottom surface of the water tank may have a failure, which is a cause of reducing the life of the ultrasonic atomization apparatus. Thus, there is a problem in that a conventional ultrasonic atomization apparatus has poor durability.

The present invention has an object to solve the problem as described above and provide an ultrasonic atomization apparatus with enhanced durability.

Means to Solve the Problem

An ultrasonic atomization apparatus according to the present invention includes: a container including a separator cup configured to accommodate a source solution at a lower part; an internal hollow structure body including a hollow inside being provided above the separator cup in the container; a water tank configured to accommodate an ultrasonic wave conveyance medium inside, the water tank and the separator cup being positioned so that a bottom surface of the separator cup is immersed in the ultrasonic wave conveyance medium; and at least one ultrasonic vibrator provided in a bottom surface of the water tank. When a part of at least one incident wave transmitted from the at least one ultrasonic vibrator is reflected on the bottom surface of the separator cup, at least one bottom surface-reflected wave is obtained. The separator cup and the at least one ultrasonic vibrator are provided to satisfy a reflected wave avoidance condition. The reflected wave avoidance condition is a condition that "the at least one bottom surface-reflected wave is not received by any of the at least one ultrasonic vibrator". The bottom surface of the separator cup is formed into a spherical surface shape with a center projecting downward. The at least one ultrasonic vibrator includes a plurality of ultrasonic vibrators, the at least one incident wave includes a plurality of incident waves, the at least one bottom surface-reflected wave includes a plurality of bottom surface-reflected waves, the reflected wave avoidance condition is a condition that "the plurality of bottom surface-reflected waves are not transmitted to any of the plurality of ultrasonic vibrators". The plurality of ultrasonic vibrators are disposed to be separated apart from each other so as to have a same distance from a reference point of the bottom surface of the water tank. The bottom surface of the water tank includes a plurality of reflected wave reception regions configured to receive the plurality of bottom surface-reflected waves. The ultrasonic atomization apparatus further comprises a plurality of ultrasonic wave absorption members provided in the plurality of reflected wave reception regions. The plurality of reflected wave reception regions are different from the regions where the plurality of ultrasonic vibrators are provided.

Effects of the Invention

In the ultrasonic atomization apparatus being the invention of the present application according to claim 1, the separator cup and the at least one ultrasonic vibrator are provided to satisfy the reflected wave avoidance condition.

As a result, in the ultrasonic atomization apparatus being the invention of the present application according to claim 1, negative influence such as failure caused by the fact that the at least one ultrasonic vibrator receives the at least one bottom surface-reflected wave does not occur. Consequently, durability can be enhanced.

These and other objects, features, aspects and advantages of the present invention will become more apparent from the following detailed description when taken in conjunction with the accompanying drawings.

DESCRIPTION OF EMBODIMENTS

First Embodiment

Figure 1:
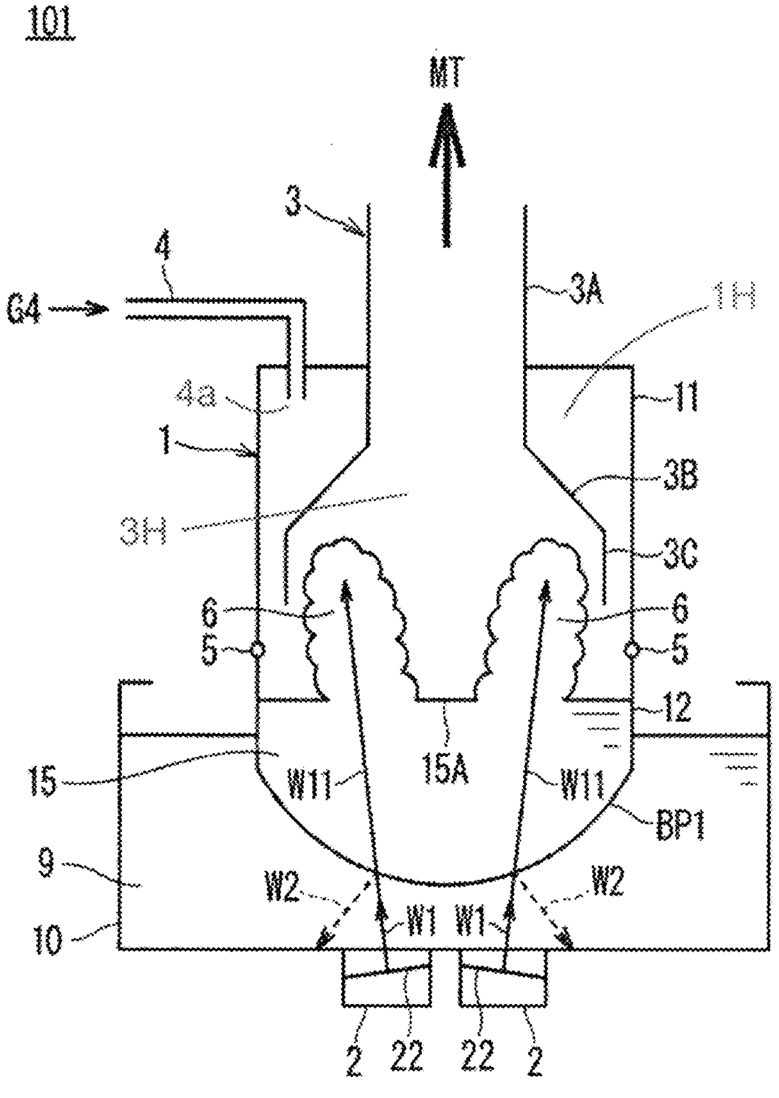
FIG. 1 is an explanatory diagram schematically illustrating a configuration of an ultrasonic atomization apparatus being a first embodiment of the present invention.

FIG. 1 is an explanatory diagram schematically illustrating a configuration of an ultrasonic atomization apparatus 101 being a first embodiment of the present invention.

As illustrated in FIG. 1, the ultrasonic atomization apparatus 101 includes a container 1, an ultrasonic vibrator 2 being an atomizer, an internal hollow structure body 3, and a gas supply unit 4. The container 1 has a structure in which an upper cup 11 and a separator cup 12 are coupled together by a connector 5. Further, the ultrasonic vibrator 2 includes an ultrasonic vibration plate 22 as its main component.

The upper cup 11 may have any shape as long as the upper cup 11 is a container having a space formed inside. In the ultrasonic atomization apparatus 101, the upper cup 11 has a substantially cylindrical shape, and in the upper cup 11, a space surrounded by a side surface being formed in a circular shape in plan view is formed. Meanwhile, in the separator cup 12, a source solution 15 is accommodated.

The ultrasonic vibrator 2 applies ultrasonic waves to the source solution 15 in the separator cup 12 from the internal ultrasonic vibration plate 22, and thereby atomizes the source solution 15. Four ultrasonic vibrators 2 (only two of them are illustrated in FIG. 1) are disposed in a bottom surface of a water tank 10. Although only schematically illustrated in FIG. 1, the upper side of the ultrasonic vibrator 2 is opened. Note that the number of ultrasonic vibrators 2 is not limited to four. One ultrasonic vibrator 2 or two or more ultrasonic vibrators 2 may be provided.

The internal hollow structure body 3 is a structure body including a hollow in side. In an upper surface part of the upper cup 11 of the container 1, an opening part is formed, and as illustrated in FIG. 1, the internal hollow structure body 3 is disposed in a manner of being inserted in to the upper cup 11 through the opening part. Here, in a state in which the internal hollow structure body 3 is inserted in the opening part, a part between the internal hollow structure body 3 and the upper cup 11 is hermetically closed. In other words, the part between the internal hollow structure body 3 and the opening part of the upper cup 11 is sealed.

For the shape of the internal hollow structure body 3, any shape may be adopted as long as the shape is a shape in which a hollow is formed inside. In the configuration example of FIG. 1, the internal hollow structure body 3 has a flask-like cross-sectional shape without a bottom surface. More specifically, the internal hollow structure body 3 illustrated in FIG. 1 includes a tubular part 3A, a circular truncated cone part 3B, and a cylindrical part 3C.

The tubular part 3A is a tubular path part having a cylindrical shape, and the tubular part 3A extends from the outside of the upper cup 11 to the inside of the upper cup 11 in a manner of being inserted through the opening part provided in the upper surface of the upper cup 11. More specifically, the tubular part 3A is divided into an upper tubular part disposed on the outside of the upper cup 11 and a lower tubular part disposed on the inside of the upper cup 11. Further, the upper tubular part is attached from the outside of the upper surface of the upper cup 11, and the lower tubular part is attached from the inside of the upper surface of the upper cup 11, and in a state in which these are attached together, the upper tubular part and the lower tubular part communicate to each other through the opening part disposed on the upper surface of the upper cup 11. One end of the tubular part 3A is connected to, for example, the inside of a thin-film film forming apparatus that forms a thin film by using a source solution mist MT, which is present on the outside of the upper cup 11. In contrast, another end of the tubular part 3A is connected to an upper end side of the circular truncated cone part 3B inside the upper cup 11.

The circular truncated cone part 3B has its external appearance (side wall surface) of a circular truncated cone shape, and has a hollow being formed inside. The circular truncated cone part 3B has its upper surface and bottom surface being opened. In other words, the hollow being formed inside is closed, and there are no upper surface and bottom surface. The circular truncated cone part 3B is present in the upper cup 11, and as described above, the upper end side of the circular truncated cone part 3B connects (communicates) to the another end of the tubular part 3A, and a lower end portion side of the circular truncated cone part 3B is connected to the upper end side of the cylindrical part 3C.

Here, the circular truncated cone part 3B has a cross-sectional shape that is widened toward the end, that is, from the upper end side toward the lower end side. In other words, the diameter of the side wall on the upper end side of the circular truncated cone part 3B is the smallest (the same as the diameter of the tubular part 3A), the diameter of the side wall on the lower end side of the circular truncated cone part 3B is the largest (the same as the diameter of the cylindrical part 3C), and the diameter of the side wall of the circular truncated cone part 3B is smoothly increased from the upper end side toward the lower end side.

The cylindrical part 3C is a part having a cylindrical shape, and as described above, the upper end side of the cylindrical part 3C connects (communicates) to the lower end side of the circular truncated cone part 3B, and the lower end side of the cylindrical part 3C faces the bottom surface of the upper cup 11. Here, in the configuration example of FIG. 1, the lower end side of the cylindrical part 3C is opened (specifically, does not have a bottom surface).

Here, in the configuration example of FIG. 1, central axis in a direction extending from the tubular part 3A to the cylindrical part 3C through the circular truncated cone part 3B in the internal hollow structure body 3 substantially matches a central axis of the upper cup 11 of the cylindrical shape. Note that the internal hollow structure body 3 may be an integral structure, or may be, as illustrated in FIG. 1, configured by combining each member of the upper tubular part constituting a part of the tubular part 3A, the lower tubular part constituting the other part of the tubular part 3A, the circular truncated cone part 3B, and the cylindrical part 3C. In the configuration example of FIG. 1, a lower end portion of the upper tubular part is connected to an outer upper surface of the upper cup 11, an upper end portion of the lower tubular part is connected to an inner upper surface of the upper cup 11, and a member consisting of the circular truncated cone part 3B and the cylindrical part 3C is connected to a lower end portion of the lower tubular part, and the internal hollow structure body 3 consisting of a plurality of members is thereby configured.

When the internal hollow structure body 3 having the above-described shape is disposed in a manner of being inserted into the upper cup 11, the inside of the upper cup 11 is divided into two spaces. The first space is a hollow part being formed inside the internal hollow structure body 3. The hollow part is hereinafter referred to as an "atomization space 3H". The atomization space 3H is a space surrounded by the inner side surface of the internal hollow structure body 3.

The space is a space formed by an inner surface of the upper cup 11 and an outer side surface of the internal hollow structure body 3. The space is hereinafter referred to as a "gas supply space 1H". As described above, the inside of the upper cup 11 is sectioned into the atomization space 3H and the gas supply space 1H.

Further, the atomization space 3H and the gas supply space 1H are connected through a lower opening part of the cylindrical part 3C.

Further, in the configuration example of FIG. 1, as can be seen from the shape of the internal hollow structure body 3 and the shape of the upper cup 11, the gas supply space 1H is the widest on the upper side of the upper cup 11 and is gradually narrower toward the lower side of the upper cup 11. In other words, a part of the gas supply space 1H that is surrounded by an outer side surface of the tubular part 3A and an inner side surface of the upper cup 11 is the widest, and a part of the gas supply space 1H that is surrounded by an outer side surface of the cylindrical part 3C and an inner side surface of the upper cup 11 is the narrowest.

The gas supply unit 4 is disposed in the upper surface of the upper cup 11. Through the gas supply unit 4, a carrier gas G4 for transferring the source solution mist MT (see FIG. 1) being atomized by the ultrasonic vibrator 2 to the outside through the tubular part 3A of the internal hollow structure body 3 is supplied. As the carrier gas G4, for example, a high-concentration inert gas can be adopted. Further, as illustrated in FIG. 1, the gas supply unit 4 is provided with a supply port 4*a*, and the carrier gas G4 is supplied into the gas supply space 1H of the container 1 through the supply port 4*a* present in the container 1.

The carrier gas G4 supplied from the gas supply unit 4 is supplied into the gas supply space 1H and fills the gas supply space 1H, and is then introduced to the atomization space 3H through the lower opening part of the cylindrical part 3C.

In the ultrasonic atomization apparatus 101 of the first embodiment, the separator cup 12 of the container 1 has a cup-like shape, and accommodates the source solution 15 inside. A bottom surface BP1 of the separator cup 12 is inclined from a side surface part toward the center, and is formed into a spherical surface shape having a set curvature K1 other than "0".

In this manner, the bottom surface BP1 of the separator cup 12 is formed into a spherical surface shape with the center projecting downward, which is defined by the set curvature K1. One of the purposes for forming the bottom surface BP1 of the separator cup 12 into the spherical surface shape is an air bubble retention prevention purpose of preventing air bubbles of the source solution 15 from remaining near the bottom surface BP1 when the source solution mist MT is generated.

Further, the water tank 10 is filled with ultrasonic wave conveyance water 9, which serves as an ultrasonic wave conveyance medium. The ultrasonic wave conveyance water 9 has a function of conveying ultrasonic vibration that is generated from the ultrasonic vibration plate 22 of the ultrasonic vibrator 2 disposed in the bottom surface of the water tank 10 to the source solution 15 in the separator cup 12.

In other words, the ultrasonic wave conveyance water 9 is accommodated in the water tank 10 so as to be able to convey, to the inside of the separator cup 12, vibration energy of ultrasonic waves (incident wave W1 thereof) applied from the ultrasonic vibrator 2.

As described above, in the separator cup 12, the source solution 15 to be atomized is accommodated, and a liquid level 15A of the source solution 15 is positioned lower than the position at which the connector 5 is disposed (see FIG. 1).

Further, regarding the separator cup 12, the positions of the separator cup 12 and the water tank 10 are set so that the entire bottom surface BP1 is immersed in the ultrasonic wave conveyance water 9. Specifically, the bottom surface BP1 of the separator cup 12 is disposed above the bottom surface of the water tank 10 without touching the bottom surface of the water tank 10, and the ultrasonic wave conveyance water 9 is present between the bottom surface BP1 of the separator cup 12 and the bottom surface of the water tank 10.

In the ultrasonic atomization apparatus 101 having the configuration as described above, when application of ultrasonic vibration is caused from the ultrasonic vibration plate 22 of each of the four ultrasonic vibrators 2, four incident waves W1 generated by the ultrasonic waves transmit through the ultrasonic wave conveyance water 9 and the bottom surface BP1 of the separator cup 12 and enter the source solution 15 in the separator cup 12 as transmission waves W11.

Then, liquid columns 6 are raised from the liquid level 15A, and the source solution 15 transition to liquid particles and to mist, producing the source solution mist MT in the atomization space 3H. The source solution mist MT generated in the gas supply space 1H is supplied to the outside through an upper opening part of the tubular part 3A by the carrier gas G4 supplied from the gas supply unit 4.

In the ultrasonic atomization apparatus 101 of the first embodiment, when a part of the four incident waves (at least one incident wave; a plurality of incident waves) transmitted from the four ultrasonic vibrators 2 (at least one ultrasonic vibrator) is reflected on the bottom surface of the bottom surface BP1 of the separator cup 12, four reflected waves W2 (at least one bottom surface-reflected wave) are obtained.

The separator cup 12 and the four ultrasonic vibrators 2 of the ultrasonic atomization apparatus 101 are provided so as to satisfy the following reflected wave avoidance condition.

The reflected wave avoidance condition is a condition that "the four reflected waves W2 are not received by any of the four ultrasonic vibrators 2". Note that, here, "not received" means that the four ultrasonic vibrators 2 are not disposed in a propagation path of the four reflected waves W2. In the following, the reflected wave avoidance condition will be described in detail.

Figure 11:
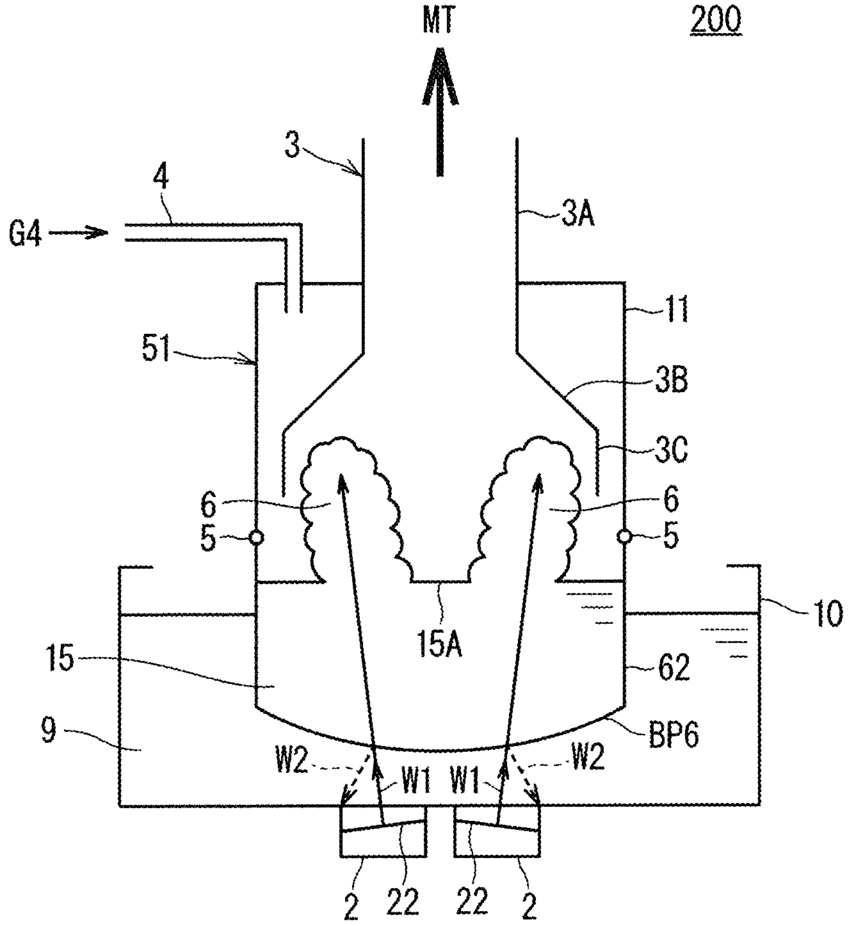
FIG. 11 is an explanatory diagram schematically illustrating a configuration of a conventional ultrasonic atomization apparatus.

FIG. 11 is an explanatory diagram schematically illustrating a configuration of a conventional ultrasonic atomization apparatus 200. In FIG. 11, parts similar to those of the ultrasonic atomization apparatus 101 of the first embodiment are denoted by the same reference signs and general description thereof will be omitted.

A container 51 corresponding to the container 1 of the ultrasonic atomization apparatus 101 includes a structure of a combination of an upper cup 11 and a separator cup 62.

Further, in the ultrasonic atomization apparatus 200, a bottom surface BP6 of the separator cup 62 of the container 51 is gently inclined from the side surface part toward the center, and is formed into a spherical surface shape defined by a set curvature K6 (<K1). The set curvature K6 is set to a relatively small value to the extent of allowing the air bubble retention prevention purpose to be achieved.

In the conventional ultrasonic atomization apparatus 200, when a part of the four incident waves transmitted from the four ultrasonic vibrators 2 is reflected on the bottom surface of the bottom surface BP6 of the separator cup 62, the four reflected waves W2 are obtained.

In the conventional ultrasonic atomization apparatus 200, the set curvature K6 of the bottom surface BP6 of the separator cup 62 is considerably smaller than the set curvature K1, and the four ultrasonic vibrators 2 are closely disposed so as to be relatively close to the center of the bottom surface of the water tank 10. The reason why the four ultrasonic vibrators 2 are closely disposed as described above is to cause the four incident waves W1 to securely reach the source solution 15 in the separator cup 62.

Thus, the separator cup 62 and the four ultrasonic vibrators 2 of the ultrasonic atomization apparatus 200 fail to satisfy the reflected wave avoidance condition unlike the first embodiment. Specifically, the four reflected waves W2 are securely received by the four ultrasonic vibrators 2. This is because the angle of reflection of the reflected waves W2 (angle of incidence of the incident waves W1) is inevitably small due to the shape of the bottom surface BP6 of the separator cup 62 and the disposition state of the four ultrasonic vibrators 2.

(Consideration on Reflected Wave Avoidance Condition)

In the following, the reflected wave avoidance condition will be considered. Note that each of the incident waves W1 and the reflected waves W2 to W4 illustrated in FIG. 1 and FIG. 11 described above and the figures to be described later is schematically illustrated. In actuality, the area of the ultrasonic vibration plate 22 to be described later in detail corresponds to an ultrasonic wave output size. In the figures, however, the ultrasonic wave output from the center point of the ultrasonic vibration plate 22 is schematically illustrated with arrows. Further, each of the incident waves W1 and the reflected waves W2 to W4 of the ultrasonic waves has rectilinear propagation property, and is beam-like.

Figure 2:
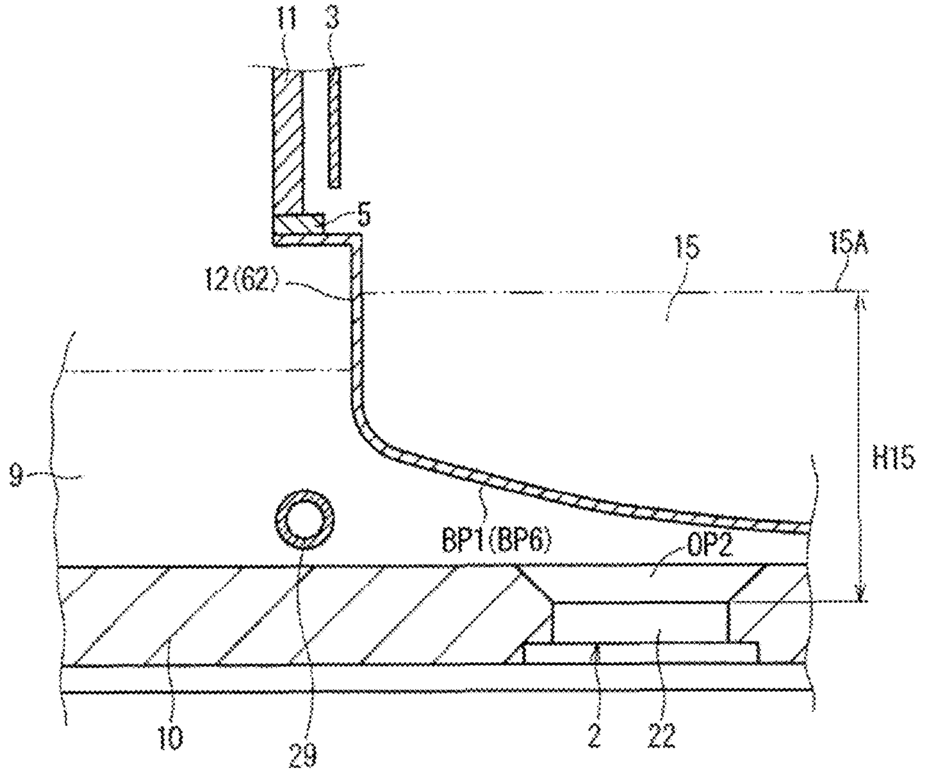
FIG. 2 is an explanatory diagram (No. 1) illustrating details of a surrounding structure of one ultrasonic vibrator.
Figure 3:
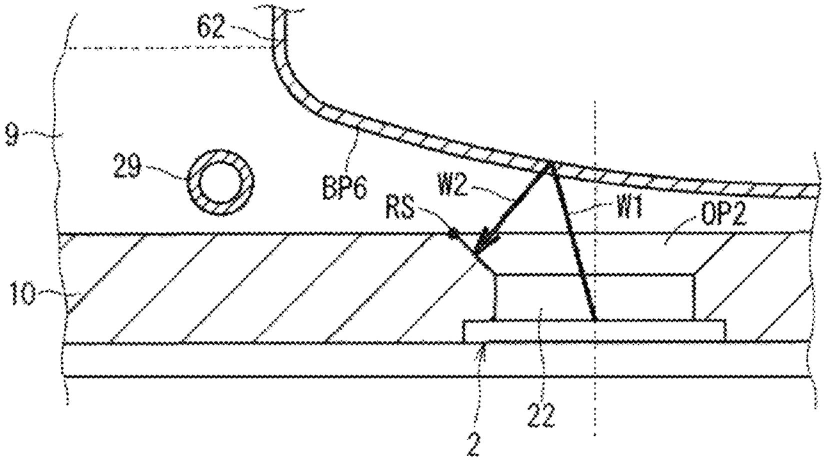
FIG. 3 is an explanatory diagram (No. 2) illustrating details of a surrounding structure of one ultrasonic vibrator.

FIG. 2 and FIG. 3 are each an explanatory diagram illustrating details of a surrounding structure of one ultrasonic vibrator 2. As illustrated in the figures, the ultrasonic vibrator 2 is provided in a state of being embedded into the bottom surface of the water tank 10. An open region OP2 is provided above the ultrasonic vibrator 2. In this case, setting is made to a liquid level height H15 from the ultrasonic vibration plate 22 to the liquid level 15A of the source solution 15.

When the ultrasonic vibration plate 22 inside the ultrasonic vibrator 2 is vibrated, the ultrasonic waves are applied. Thus, to be precise, the liquid level height H15 is height from the center of the ultrasonic vibration plate 22 to the liquid level 15A. Note that a cooling pipe 29 allows cooling water to flow inside in order to cool the ultrasonic wave conveyance water 9.

The ultrasonic vibration plate 22 of the ultrasonic vibrator 2 has a disk-like shape having an outer diameter of approximately 20 mm, and ultrasonic waves of the same size as the disk-like ultrasonic vibration plate 22 are generated due to vibration of the ultrasonic vibration plate 22. The ultrasonic waves have high directivity, and travel without spreading within a near field length DL and spread at a certain angle beyond the near field length DL. Note that the near field length DL can be calculated according to the following equation (1).

$$DL = ((ED)^2/\lambda - \lambda)/4 \tag{1}$$

Note that, in equation (1), "ED" represents the outer diameter of the ultrasonic vibration plate 22, and "λ," represents speed of sound (1500 m/sec in water).

It is experientially known that, based on factors such as the near field length DL described above, the atomization amount of the source solution mist MT can be brought to the maximum level when the liquid level height H15 is set to 30 to 40 mm. Thus, the distance between the bottom surface BP1 (BP6) of the separator cup 12 (62) and the ultrasonic vibration plate 22 of the ultrasonic vibrator 2 is inevitably reduced.

Figure 4:
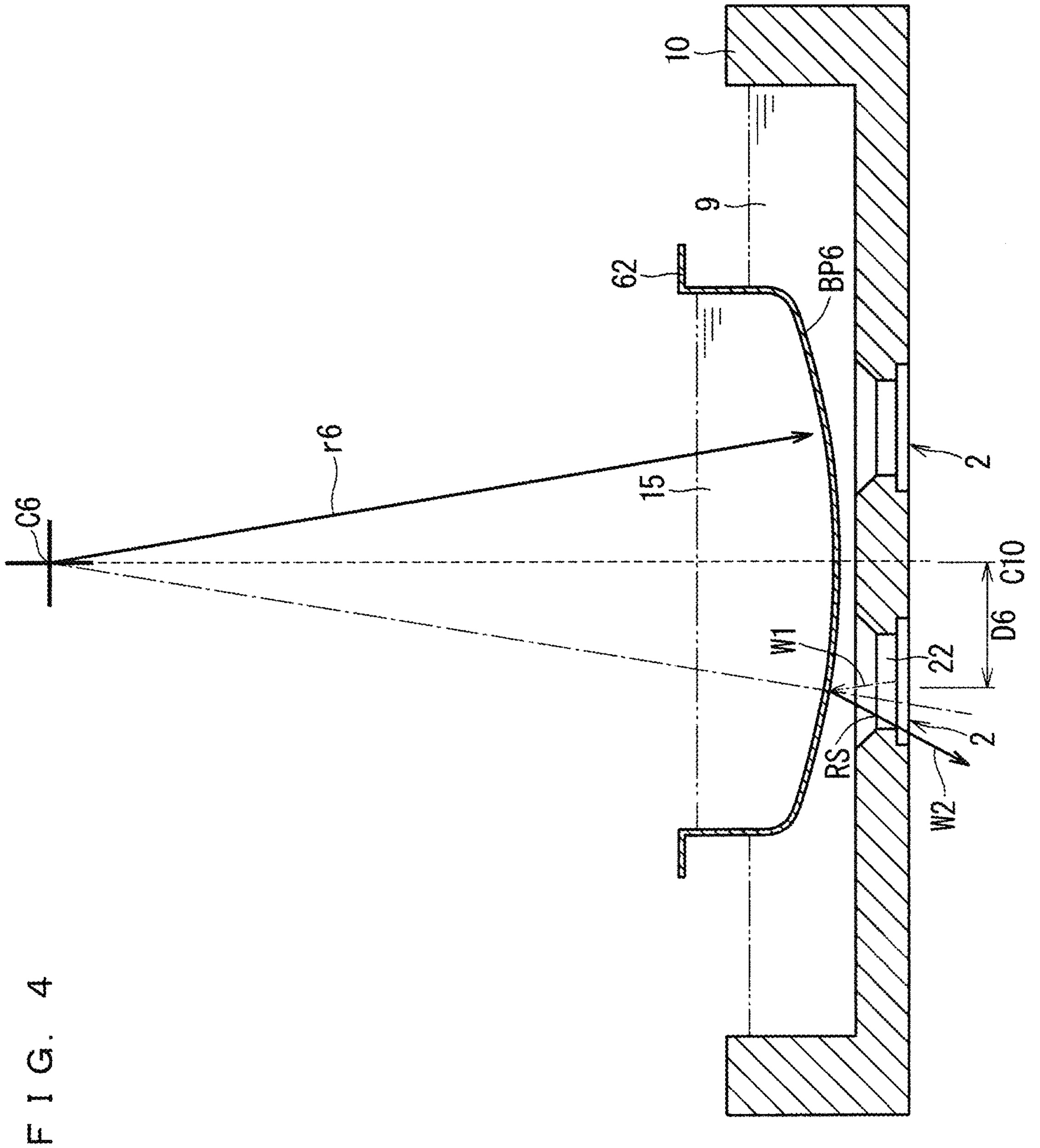
FIG. 4 is an explanatory diagram schematically illustrating a curvature radius of a bottom surface in a conventional separator cup.

FIG. 4 is an explanatory diagram schematically illustrating a curvature radius r6 of the bottom surface BP6 of the conventional separator cup 62. As illustrated in the figure, the cross-sectional shape of the bottom surface BP6 is formed into an arc shape having a relatively long curvature radius r6 with respect to an imaginary center point C6, and the set curvature K6 (=1/r6) is sufficiently small.

Further, setting is made to the same distance D6 from a center point C10 (reference point) of the bottom surface of the water tank 10 to a center position of the ultrasonic vibration plate 22 of each of the four ultrasonic vibrators 2. The distance D6 is relatively short.

Thus, it is substantially impossible that the conventional ultrasonic atomization apparatus 200 satisfies the reflected wave avoidance condition. This is because the reflected wave avoidance condition is not taken into consideration, and the set curvature K6 of the bottom surface BP6 of the separator cup 62 in consideration of the air bubble retention prevention purpose need not be set large. In addition, when the set curvature K6 is set large, there is a negative element that the amount of the source solution 15 accommodated in the separator cup 62 is reduced due to the restriction of the liquid level height H15, and thus it is desirable that the set curvature K6 be set small within the range of satisfying the air bubble retention prevention purpose.

Thus, as illustrated in FIG. 3 and FIG. 4, in the bottom surface BP6 of the conventional separator cup 62 in which the set curvature K6 is set to be relatively small, the reflected waves W2 are invariably received in a partial region RS of the ultrasonic vibrator 2.

Figure 5:
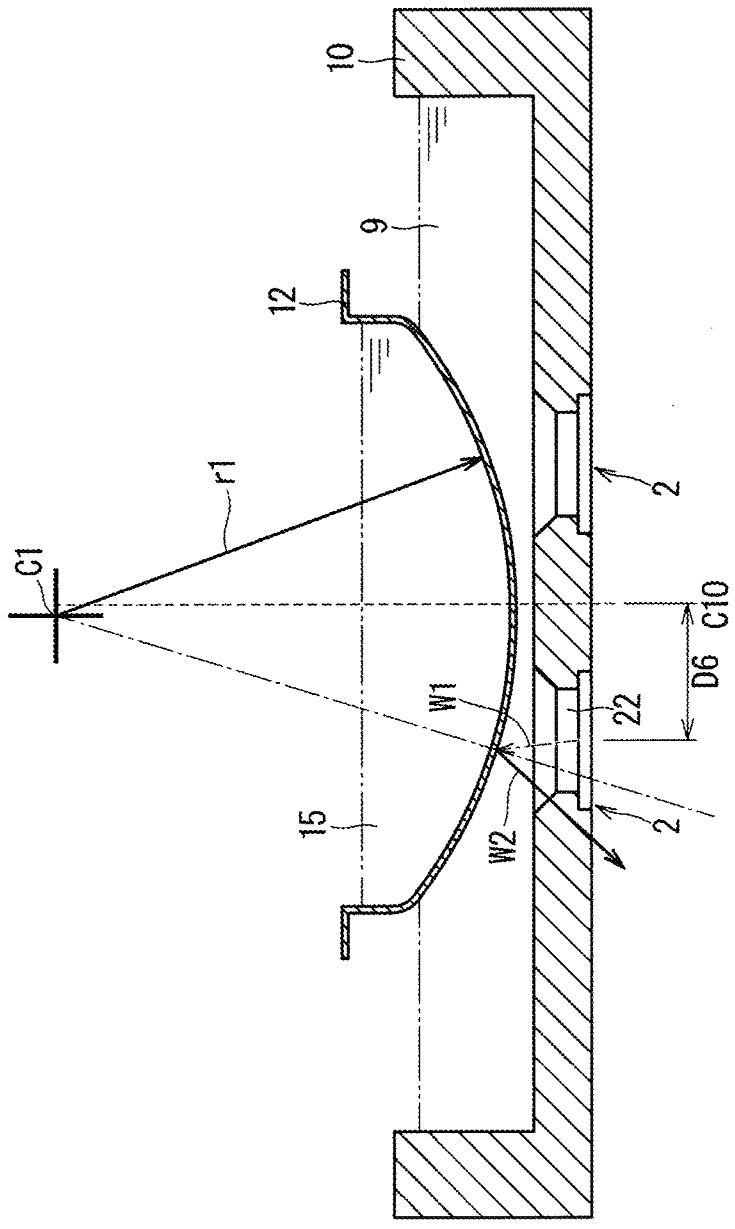
FIG. 5 is an explanatory diagram illustrating a curvature radius of a bottom surface of a separator cup and a disposition state of ultrasonic vibrators.

FIG. 5 is an explanatory diagram illustrating a curvature radius r1 of the bottom surface BP1 of the separator cup 12 and a disposition state of the ultrasonic vibrators 2.

As illustrated in the figure, the cross-sectional shape of the bottom surface BP1 is formed into an arc shape having a relatively short curvature radius r1 with respect to an imaginary center point C1, and the set curvature K1(=1/r1) is sufficiently large as compared to the set curvature K6.

However, in a state in which the distance D6 from the center position of the ultrasonic vibration plate 22 of each of the ultrasonic vibrators 2 is relatively short, the four ultrasonic vibrators 2 (ultrasonic vibration plates 22) are disposed at positions relatively close to the center part of the bottom surface BP1 in plan view.

In the above-described disposition state of the four ultrasonic vibrators 2, the angle of reflection of the reflected waves W2 (angle of incidence of the incident waves W1) cannot be increased, which may still hinder satisfaction of the reflected wave avoidance condition. Specifically, as illustrated in FIG. 5, the reflected waves W2 obtained when the incident waves W1 of each ultrasonic vibrator 2 (ultrasonic vibration plate 22) are reflected on the bottom surface BP1 may be received in the ultrasonic vibrators 2.

Note that, in the disposition state of the four ultrasonic vibrators 2 illustrated in FIG. 5 as well, the reflected wave avoidance condition can be satisfied by setting to a curvature radius rx that is even shorter than the curvature radius r1 illustrated in FIG. 5 and setting the set curvature Kx defining the spherical surface of the bottom surface BP1 to be larger than the set curvature K1.

Figure 6:
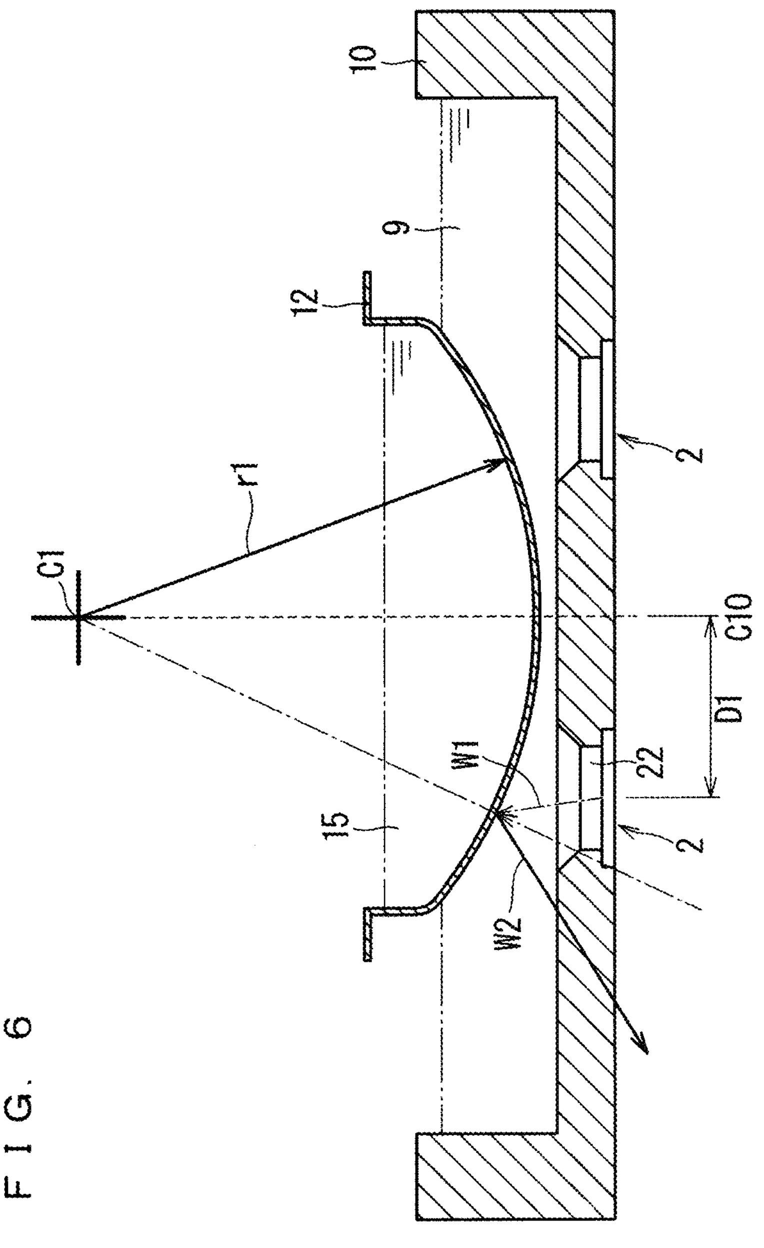
FIG. 6 is an explanatory diagram illustrating a curvature radius of a bottom surface of a separator cup of the first embodiment and a disposition state of ultrasonic vibrators.
Figure 7:
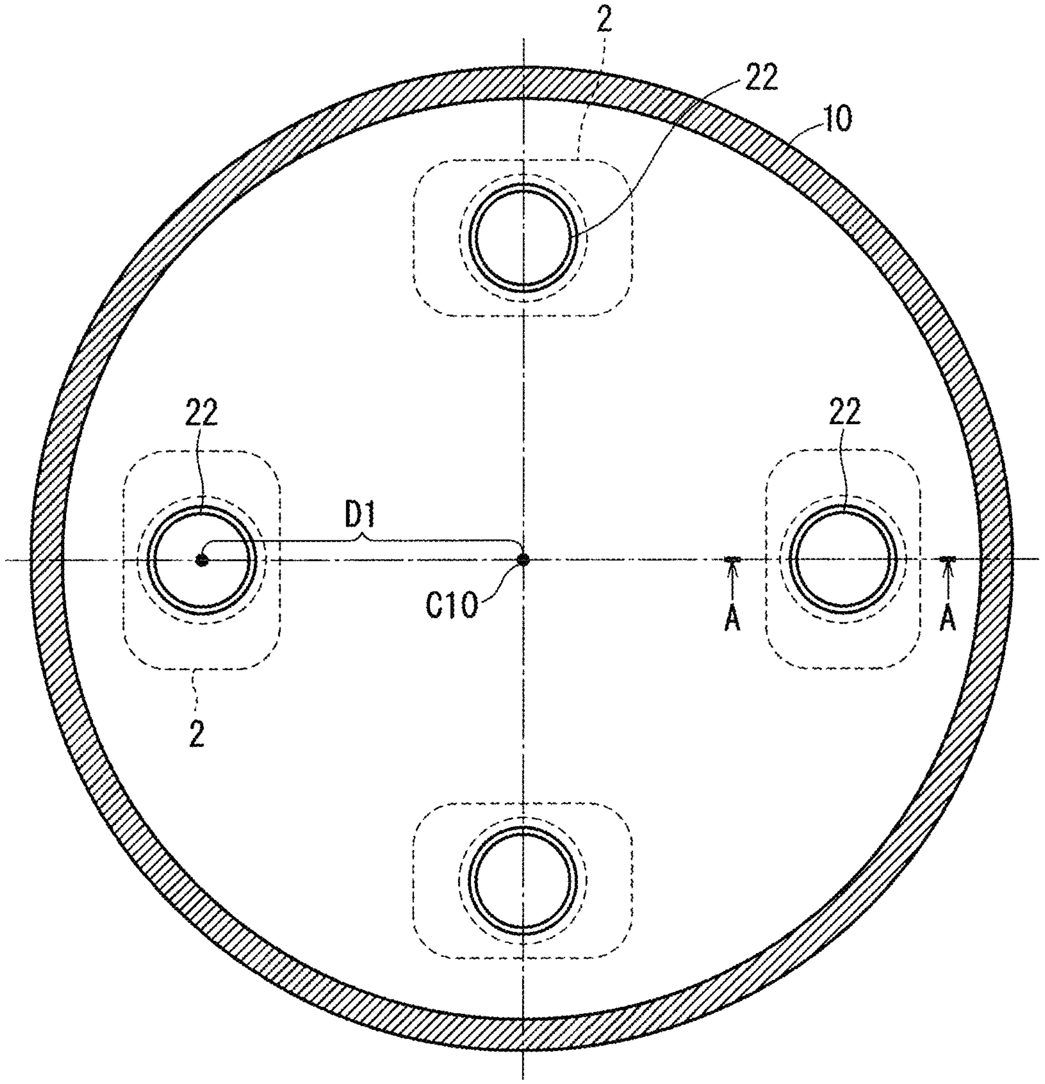
FIG. 7 is a plan view illustrating a disposition state of four ultrasonic vibrators in a bottom surface of a water tank of the first embodiment.

FIG. 6 is an explanatory diagram illustrating the curvature radius r1 of the bottom surface BP1 of the separator cup 12 of the first embodiment and the disposition state of the ultrasonic vibrators 2. FIG. 7 is a plan view illustrating a disposition state of the four ultrasonic vibrators 2 in the bottom surface of the water tank 10. In FIG. 7, the planar shape of the bottom surface of the water tank 10 exhibits a circular configuration. Note that the hatched region denotes the side surface of the water tank 10.

As illustrated in FIG. 6, the cross-sectional shape of the bottom surface BP1 is formed into an arc shape having a relatively short curvature radius r1 with respect to the imaginary center point C1, and the set curvature K1 is sufficiently large as compared to the set curvature K6.

Further, as illustrated in FIG. 7, in the bottom surface of the water tank 10, the four ultrasonic vibrators 2 are disposed such that the four ultrasonic vibration plates 22 are located to be annularly spaced apart at regular intervals (intervals of 90 degrees) along outer circumference of a distance D1 (>D6) about the center point C10 being a reference point.

In this manner, the four ultrasonic vibrators 2 (ultrasonic vibration plates 22) are disposed to be separated apart from each other so as to have the same distance D1 from the center point C10 being a reference point of the bottom surface of the water tank 10.

Further, the distance D1 from the center point C10 of the bottom surface of the water tank 10 is set to be longer than the conventional distance D6. As a result, each of the four ultrasonic vibration plates 22 is made far from the center point C10, and the intervals of the four ultrasonic vibrators 2 are also sufficiently large.

Figure 8:
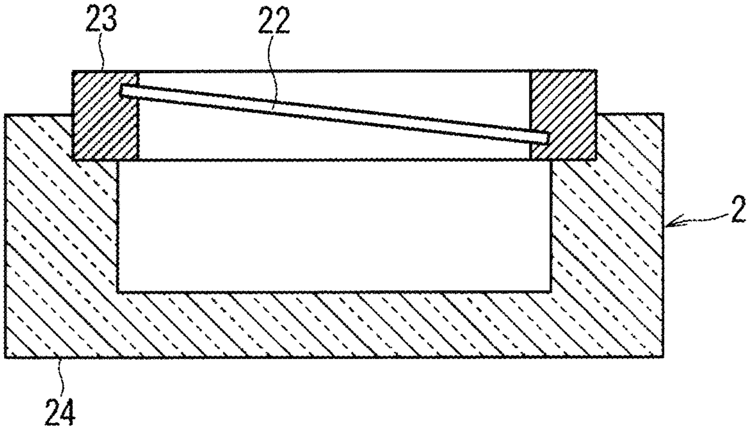
FIG. 8 is a cross-sectional diagram of an ultrasonic vibrator illustrating the A-A cross-section of FIG. 7.

FIG. 8 is a cross-sectional diagram of the ultrasonic vibrator 2 illustrating the A-A cross-section of FIG. 7. As illustrated in the figure, the ultrasonic vibration plate 22 in the ultrasonic vibrator 2 is fixed to be slightly inclined due to a support rubber 23 that is provided on an upper portion of a base 24. Specifically, the inclination is approximately 7 degrees with respect to the bottom surface of the water tank 10.

Specifically, the ultrasonic vibration plate 22 of each ultrasonic vibrator 2 is slightly inclined toward a direction away from the center point C10. In this manner, the four ultrasonic vibration plates 22 have a predetermined angle, other than "0", with respect to the bottom surface of the water tank 10.

As described above, the first embodiment provides technical improvement that the set curvature K1 of the bottom surface BP1 of the separator cup 12 is set larger than the conventional set curvature K6, and the distance D1 from the center point C10 of the bottom surface of the water tank 10 of each of the four ultrasonic vibrators 2 (ultrasonic vibration plates 22) is set longer than the conventional distance D6.

Thus, by providing the technical improvement, the set curvature K1 of the bottom surface BP1 and the distance D1 from the center point C10 of the four ultrasonic vibration plates 22 can be set so that the reflected wave avoidance condition is satisfied.

As a result, as illustrated in FIG. 6, the angle of reflection of the reflected waves W2 (angle of incidence of the incident waves W1) can be made larger than the conventional technology, with the result that the effect that the reflected waves W2 are not received in the ultrasonic vibrators 2 can be achieved.

Note that, for the convenience of description, although FIG. 6 illustrates the incident wave W1 and the reflected wave W2 related to one ultrasonic vibrator 2, the reflected waves W2 are not received in the other three ultrasonic vibrators 2 as well. The reason therefor is as follows.

Each of the four ultrasonic vibrators 2 is disposed at the same distance D1 from the center point C10, and the inclination of the four ultrasonic vibration plates 22 is also inclined at approximately 7 degrees toward a direction away from the center point C10 in common. Thus, regarding the four incident waves W1 transmitted from the four ultrasonic vibration plates 22, the angle of incidence of the incident waves W1 (angle of reflection of the reflected waves W2) with respect to the bottom surface BP1 of the separator cup 12 is the same. Thus, the four reflected waves W2 are not received in the four ultrasonic vibrators 2 (ultrasonic vibration plates 22).

In this manner, in the ultrasonic atomization apparatus 101 of the first embodiment, the separator cup 12 and the four ultrasonic vibrators 2 are set so as to satisfy the reflected wave avoidance condition. Specifically, the bottom surface BP1 of the separator cup 12 is set to the set curvature K1 (>K6), and is set to the distance D1 (>D6) from the center point C10 of the bottom surface of the water tank 10 of each of the four ultrasonic vibrators 2.

Thus, in the ultrasonic atomization apparatus 101, negative influence such as failure caused by the fact that the four ultrasonic vibrators 2 receive the four reflected waves W2 (at least one bottom surface-reflected wave) does not occur. Consequently, durability of the ultrasonic atomization apparatus 101 can be enhanced.

Further, the bottom surface BP1 of the separator cup 12 is formed into a spherical surface shape with the center projecting downward. Thus, when the set curvature K1 defining the spherical surface is set to be sufficiently larger than the conventional set curvature K6 and the angle of reflection of the four reflected waves W2 (angle of incidence of the four incident waves W1) is set large, the reflected wave avoidance condition can be satisfied.

In addition, each of the four ultrasonic vibrators 2 is disposed to be separated apart from each other so as to have the same distance D1 from the center point C10 of the bottom surface of the water tank 10 with respect to the separator cup 12 having the bottom surface BP1 in which the spherical surface is defined by the set curvature K1.

Thus, when the distance D1 is made sufficiently longer than the conventional distance D6, the reflected wave avoidance condition can be satisfied.

Second Embodiment

Figure 9:
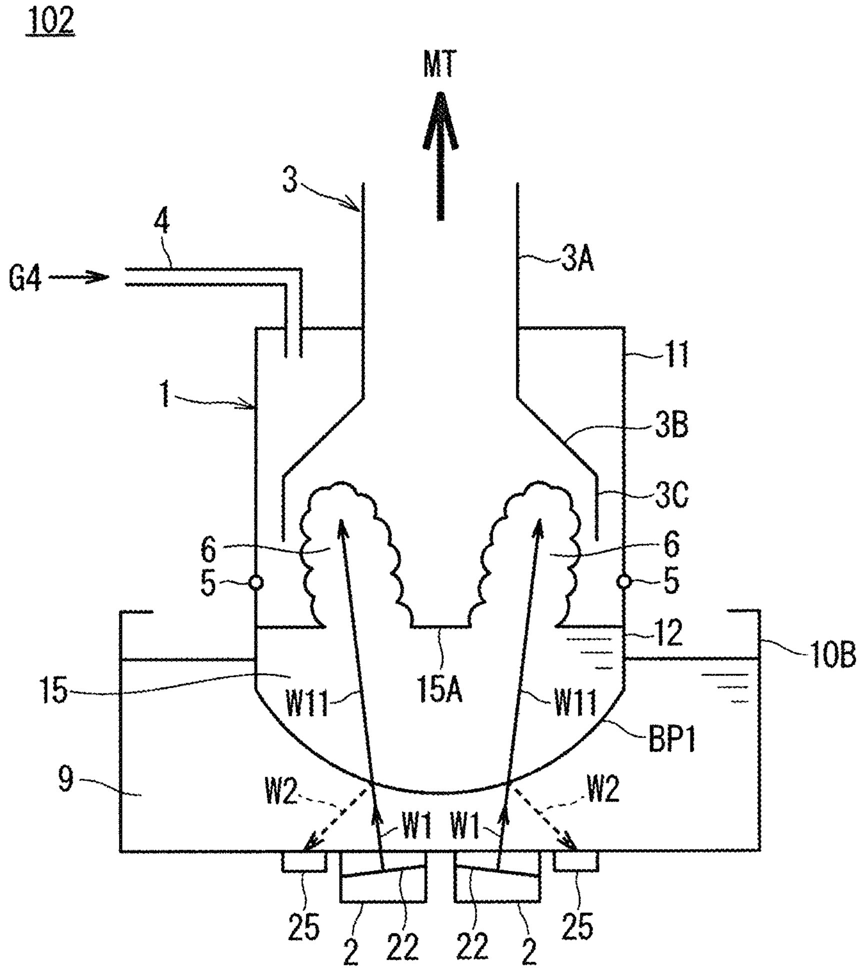
FIG. 9 is an explanatory diagram schematically illustrating a configuration of an ultrasonic atomization apparatus being a second embodiment of the present invention.

FIG. 9 is an explanatory diagram schematically illustrating a configuration of an ultrasonic atomization apparatus 102 being a second embodiment of the present invention. In FIG. 9, constituent parts similar to those of the ultrasonic atomization apparatus 101 of the first embodiment are denoted by the same reference signs and description thereof is omitted as appropriate, and features of the second embodiment will be mainly described.

As illustrated in the figure, four ultrasonic wave absorption members 25 (only two of them are illustrated in FIG. 9) are provided on a surface of the bottom surface of a water tank 10B, so as to correspond to the four reflected waves W2. The four ultrasonic wave absorption members 25 are embedded in a part of the bottom surface of the water tank 10B so as to form a surface region of the water tank 10B. The difference between the water tank 10B of the second embodiment and the water tank 10 of the first embodiment lies in presence or absence of the four ultrasonic wave absorption members 25.

The four ultrasonic wave absorption members 25 are provided in four reflected wave reception regions that receive the four reflected waves W2 in the bottom surface of the water tank 10B. Similarly to the bottom surface of the water tank 10 illustrated in FIG. 2 to FIG. 6, the bottom surface of the water tank 10B has predetermined thickness. Thus, in the bottom surface of the water tank 10B, a recess portion is provided in an upper portion of each of the four reflected wave reception regions, and the ultrasonic wave absorption member 25 is embedded in each recess portion.

Note that possible examples of a constituent material of the ultrasonic wave absorption member 25 include various rubber materials including urethane rubber, silicone rubber, fluorocarbon rubber, ethylene propylene rubber, butyl rubber, and ethylene rubber.

In this manner, the ultrasonic atomization apparatus 102 of the second embodiment has features in that the four ultrasonic wave absorption members 25 (a plurality of ultrasonic wave absorption members) are provided in the four reflected wave reception regions (a plurality of reflected wave reception regions) in the bottom surface of the water tank 10B.

The four reflected wave reception regions can be recognized in advance from the disposition of the four ultrasonic vibrators 2 (ultrasonic vibration plates 22), the inclination of the ultrasonic vibration plates 22, the set curvature K1 defining the spherical surface of the bottom surface BP1 of the separator cup 12, and the like.

As described above, owing to the four ultrasonic wave absorption members 25 (a plurality of ultrasonic wave absorption members) provided in the bottom surface of the water tank 10B, the ultrasonic atomization apparatus 102 of the second embodiment can securely avoid a phenomenon in which the four reflected waves W2 (a plurality of bottom surface-reflected waves) enter the bottom surface of the water tank 10B other than the four ultrasonic wave absorption members 25, and can protect the bottom surface of the water tank 10B.

As a result, the ultrasonic atomization apparatus 102 of the second embodiment can have higher durability than that of the first embodiment.

Third Embodiment (Basic Configuration)

Figure 10:
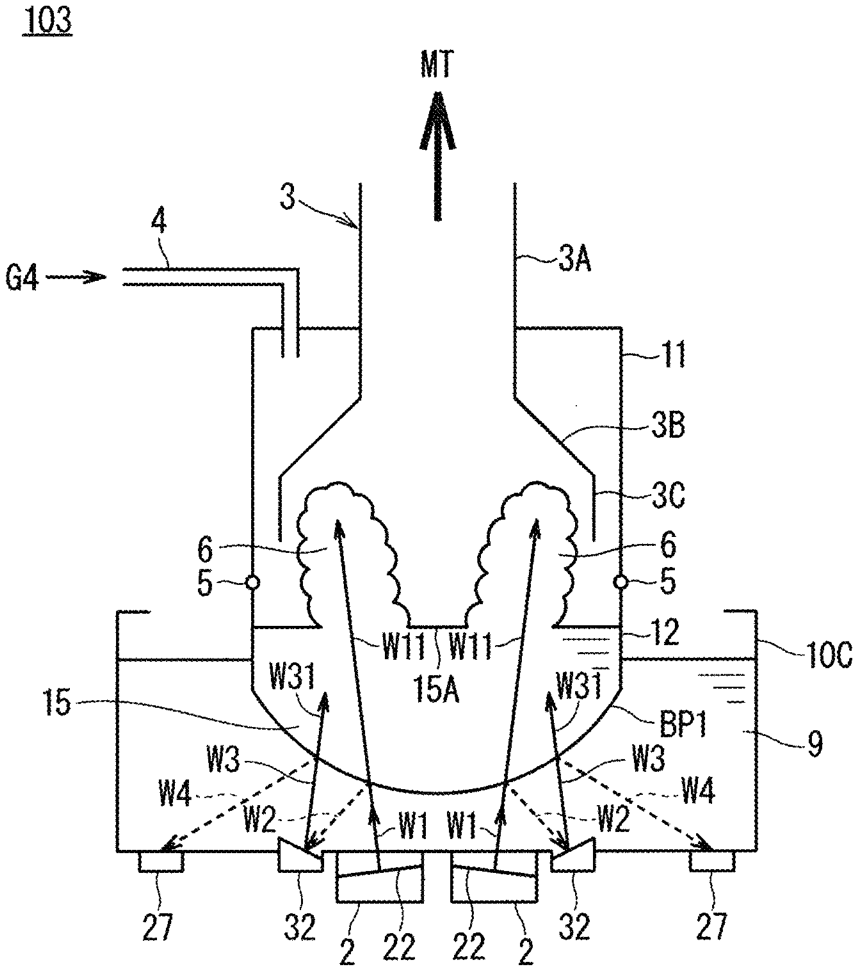
FIG. 10 is an explanatory diagram schematically illustrating a configuration of an ultrasonic atomization apparatus being a third embodiment of the present invention.

FIG. 10 is an explanatory diagram schematically illustrating a configuration (including a modification thereof) of an ultrasonic atomization apparatus 103 being a third embodiment of the present invention. In FIG. 10, constituent parts similar to those of the ultrasonic atomization apparatus 101 of the first embodiment are denoted by the same reference signs and description thereof is omitted as appropriate, and features of the third embodiment will be mainly described. Note that FIG. 10 also illustrates ultrasonic wave absorption members 27 as a modification to be described later.

As illustrated in the figure, four ultrasonic wave reflection members 32 (only two of them are illustrated in FIG. 10) are provided on a surface of the bottom surface of the water tank 10C, so as to correspond to the four reflected waves W2. The four ultrasonic wave reflection members 32 are embedded in a part of the bottom surface of the water tank 10C so as to form a surface region of the water tank 10C. Regarding the basic configuration of the third embodiment, the difference between the water tank 10C of the third embodiment and the water tank 10 of the first embodiment lies in presence or absence of the four ultrasonic wave reflection members 32.

The four ultrasonic wave reflection members 32 are provided in the four reflected wave reception regions that receive the four reflected waves W2 in the bottom surface of the water tank 10C. In the bottom surface of the water tank 10C, a recess portion is provided in an upper portion of each of the four reflected wave reception regions, and the ultrasonic wave reflection member 32 is embedded in each recess portion.

In this manner, the basic configuration of the ultrasonic atomization apparatus 103 of the third embodiment has features in that the four ultrasonic wave reflection members 32 (a plurality of ultrasonic wave reflection members) are provided in the four reflected wave reception regions (a plurality of reflected wave reception regions) in the bottom surface of the water tank 10C.

Note that possible examples of a constituent material of the ultrasonic wave reflection member 32 include stainless steel, copper, and the like.

In this manner, owing to the four ultrasonic wave reflection members 32 (a plurality of ultrasonic wave reflection members) provided in the bottom surface of the water tank 10C, the basic configuration of the ultrasonic atomization apparatus 103 of the third embodiment can securely avoid a phenomenon in which the four reflected waves W2 (a plurality of bottom surface-reflected waves) enter the bottom surface of the water tank 10C other than the four ultrasonic wave reflection members 32, and can protect the bottom surface of the water tank 10C.

As a result, the basic configuration of the ultrasonic atomization apparatus 103 of the third embodiment can have durability higher than that of the first embodiment.

Note that, when the four reflected waves W2 are reflected on the four ultrasonic wave reflection members 32, four secondary reflected waves W3 (a plurality of secondary reflected waves) are obtained.

Surfaces of the four ultrasonic wave reflection members 32 of the third embodiment have a predetermined angle, other than "0", with respect to the bottom surface of the water tank 10C, and are specifically inclined to a direction of the center point C10 of the bottom surface of the water tank 10.

Further, the predetermined angle of the surfaces of the ultrasonic wave reflection members 32 is set such that the four secondary reflected waves W3 enter the source solution 15 as secondary transmission waves W31 through the bottom surface BP1 of the separator cup 12.

In this manner, the basic configuration of the four ultrasonic wave reflection members 32 of the third embodiment has the predetermined angle, other than "0", with respect to the bottom surface of the water tank 10C, and can thus securely cause a part of the four secondary reflected waves W to enter the source solution 15 as the secondary transmission waves W31 by adjusting the predetermined angle.

As a result, the ultrasonic atomization apparatus 103 of the third embodiment allows the four secondary transmission waves W31 generated by the four secondary reflected waves W3 to enter the source solution 15 in addition to the four transmission waves W11 generated by the four incident waves W1, and thus exerts an atomization amount increase effect that the atomization amount of the source solution mist MT to be generated can be increased accordingly.

Modification

Further, in the ultrasonic atomization apparatus 103 of the third embodiment, when a part of the four secondary reflected waves W3 is reflected on the bottom surface of the bottom surface BP1 of the separator cup 12, four tertiary reflected waves W4 are obtained.

Thus, four ultrasonic wave absorption members 27 (only two of them are illustrated in FIG. 10) are provided on a surface of the bottom surface of the water tank 10C, so as to correspond to the four tertiary reflected waves W4. The four ultrasonic wave absorption members 27 are embedded in a part of the bottom surface of the water tank 10C so as to form a surface region of the water tank 10C. The difference between the water tank 10C of the modification of the third embodiment and the water tank 10 of the first embodiment lies in presence or absence of the four ultrasonic wave reflection members 32 and the four ultrasonic wave absorption members 27. Note that possible examples of a constituent material of the ultrasonic wave absorption member 27 include constituent materials similar to those of the ultrasonic wave absorption member 25 of the second embodiment.

The four ultrasonic wave absorption members 27 are provided in four tertiary reflected wave reception regions that receive the four tertiary reflected waves W4 in the bottom surface of the water tank 10C. In the bottom surface of the water tank 10C, a recess portion is provided in an upper portion of each of the four tertiary reflected wave reception regions, and the ultrasonic wave absorption member 27 is embedded in each recess portion.

In this manner, the modification of the ultrasonic atomization apparatus 103 of the third embodiment has features in that the four ultrasonic wave absorption members 27 (a plurality of ultrasonic wave reflection members) are further provided in the four tertiary reflected wave reception regions (a plurality of tertiary reflected wave reception regions) in the bottom surface of the water tank 10C.

Owing to the four ultrasonic wave absorption members 27 (a plurality of ultrasonic wave reflection members) provided in the bottom surface of the water tank 10C, the modification of the third embodiment described above can securely avoid a phenomenon in which the four tertiary reflected waves W4 (a plurality of tertiary reflected waves) enter the bottom surface of the water tank 10C other than the four ultrasonic wave absorption members 27, and can protect the bottom surface of the water tank 10C.

As a result, the modification of the ultrasonic atomization apparatus 103 of the third embodiment can have durability higher than that of the basic configuration of the third embodiment.

<Constituent Material of Separator Cup 12>

As the constituent material of the separator cup 12 of each of the first embodiment to the third embodiment, polypropylene (PP), which easily transmits ultrasonic waves, is generally adopted. However, fluorocarbon resin as typified by PTFE may be adopted. Specifically, the separator cup 12 may have the bottom surface BP1 whose constituent material is fluorocarbon resin.

The fluorocarbon resin has a property of having relatively high tolerance against various solvents (solvent of the source solution 15). Accordingly, the separator cup 12 of the ultrasonic atomization apparatus(es) 101 (to 103) can exert relatively high tolerance against the source solution 15.

In contrast, the fluorocarbon resin is inferior to PP in transmissiveness of ultrasonic waves. Thus, in each of the ultrasonic atomization apparatuses 101 to 103, in order to obtain ultrasonic wave characteristics at practical level, it is conceivable to set the thickness of the bottom surface BP1 to 0.5 mm or less, desirably 0.3 mm or less.

Further, the ultrasonic atomization apparatus 103 of the third embodiment having the four ultrasonic wave reflection members 32 has the atomization amount increase effect, and can accordingly improve the inferiority of the fluorocarbon resin in transmissiveness of ultrasonic waves.

While the present invention has been described in detail, the foregoing description is in all aspects illustrative and not restrictive. It is therefore understood that numerous unillustrated modifications can be devised without departing from the scope of the present invention.

The invention claimed is:

1. An ultrasonic atomization apparatus comprising:

a container including a separator cup configured to accommodate a source solution at a lower part;

an internal hollow structure body including a hollow inside being provided above said separator cup in said container;

a water tank configured to accommodate an ultrasonic wave conveyance medium inside, said water tank and said separator cup being positioned so that a bottom surface of said separator cup is immersed in said ultrasonic wave conveyance medium; and a plurality of ultrasonic vibrators provided in a bottom surface of said water tank, wherein when a part of a plurality of incident waves transmitted from said plurality of ultrasonic vibrators is reflected on said bottom surface of said separator cup, a plurality of bottom surface-reflected waves is obtained, said separator cup and said plurality of ultrasonic vibrators are provided to satisfy a reflected wave avoidance condition, said reflected wave avoidance condition is a condition that "said plurality of bottom surface-reflected waves is not received by any of said plurality of ultrasonic vibrators", said bottom surface of said separator cup is formed into a spherical surface shape with a center projecting downward, said plurality of ultrasonic vibrators are disposed to be separated apart from each other so as to have a same distance from a reference point of said bottom surface of said water tank, said bottom surface of said water tank includes a plurality of reflected wave reception regions configured to receive said plurality of bottom surface-reflected waves, said ultrasonic atomization apparatus further comprises a plurality of ultrasonic wave absorption members embedded in recess portions in said plurality of reflected wave reception regions, a constituent material of each of said plurality of ultrasonic wave absorption members is a rubber material, and said plurality of reflected wave reception regions are different from the regions where said plurality of ultrasonic vibrators are provided.

2. The ultrasonic atomization apparatus according to claim 1, wherein a constituent material of said bottom surface of said separator cup is fluorocarbon resin.

* * * * *